United States Patent Office 3,501,344

Patented Mar. 17, 1970

3,501,344

MAGNETIC RECORDING TAPE SUPPORTED ON POLY(ETHYLENE 2,6 - NAPHTHALENEDICARBOXYLATE)

Marshall T. Watson and William D. Kennedy, Kingsport, Tenn., assignors to Eastman Kodak Company, Rochester, N.Y., a corporation of New Jersey No Drawing. Filed July 28, 1967, Ser. No. 656,706
Int. Cl. B29d *7/24;* H01f *10/04*
U.S. Cl. 117—236 7 Claims

ABSTRACT OF THE DISCLOSURE

An improved magnetic recording tape comprising a thin layer of a magnetically susceptible material dispersed in a nonmagnetic binder coated on a flexible support consisting essentially of an asymmetrically oriented high-melting linear polyester of substantially equimolar proportions of a dicarboxylic acid and a glycol, said dicarboxylic acid being essentially composed of 2,6-naphthalenedicarboxylic acid and said glycol being essentially composed of ethylene glycol, which support is characterized in that it has a lengthwise tensile strength of at least 60,000 p.s.i. at a high strain rate of 1000% per minute and has a lengthwise modulus of elasticity of at least $12\times10^5$ p.s.i. Longitudinal stretch is in the range of about 3.5–6.0 times; widthwise adjustment is in the range of about 0.9–1.4 times original width; stretching is in the range of about 105°–150° C. and heat setting and relaxing is in the range of about 120°–250° C.

This invention relates to a magnetic recording tape comprising a film support and an adherent layer consisting of magnetizable particles dispersed in a binder. More particularly, the invention relates to a support composed of a polymer obtained by condensing an alkylene glycol (predominately ethylene glycol) with a dicarboxylic acid which is essentially composed of 2,6-naphthalenedicarboxylic acid. Reference is invited to U.S. Patent 2,975,-484, patented Mar. 21, 1961, which is illustrative of the prior art. More particular reference is invited to our own U.S. Patent No. 3,284,223, patented on Nov. 8, 1966, which is incorporated herein by reference so as to avoid a lengthy discussion of the state of the art. See also British Patents 604,073 and 829,009.

Magnetic sound and video recording tapes are known to comprise magnetizable particles dispersed throughout a nonmagnetic binder in the form of a thin layer coated on a flexible supporting film or web. Commercial tapes are available in which the supporting film is either cellulose acetate, poly(vinyl chloride), or an oriented film of poly(ethylene terephthalate). Although such tapes are in wide commercial use, they are known to have certain deficiencies.

It is one of the objects of this invention to overcome certain deficiencies and to produce a new and improved magnetic recording tape which is distinguished from the magnetic tapes of the prior art, not only by the chemical constitution of the supporting film, but also by certain unexpectedly improved physical properties, especially high lengthwise modulus, high lengthwise tensile strength, and low elongation at break.

It is an outstanding object of this invention to provide such magnetic tapes which have tensile strengths of at least 60,000 p.s.i. at a high strain rate of about 1000% per minute.

Other objects will become apparent elsewhere in this specification.

It is a novel and unexpected finding of this invention that tapes produced by the practice of the invention, not only have very high lengthwise tensile strength in tests at ordinary testing rates, i.e., 50–100% per minute, but also have unexpectedly improved tensile strengths at high testing rates (1000–1250% per minute) compared to one of the best known commercial audiotapes in which the tape support is oriented poly(ethylene terephthalate) film or poly(1,4-cyclohexylenedimethylene terephthalate) as decribed in our U.S. Patent No. 3,284,223, cited above; see Table 3 below.

A further advantage of the tapes produced in accordance with the instant invention compared to those of the prior art is that the tapes of the invention have a relatively low permanent elongation after break, especially at high testing speeds. Whereas known magnetic tapes using oriented poly(ethylene terephthalate) as the support have elongations at break as high as 100%, or even higher, tapes produced under the practice of the instant invention have elongations (less than 40%) which are usually less than one half of that which would characterize a tape made in the same manner from poly(ethylene terephthalate). It is a distinct advantage that a magnetic tape have a low permanent elongation after break, in order that a broken tape, after splicing, may reproduce sound as closely as possible to the sound of the original unbroken tape.

Another desirable property of magnetic tape is a high lengthwise tensile modulus. At a given cross sectional area, the higher the lengthwise modulus of the tape, the greater is its resistance to elastic change of length under various tensions. It is readily appreciated that any tape deformation while it is under tension during playback would result in undesirable sound distortions, for example, amplitude modulation as a result of periodic lifting away of the tape from the head. Under the practice of this invention, films are produced having a high lengthwise modulus (greater than about $12\times10^5$ p.s.i.); again, these films have unexpectedly improved modulus at high testing rates compared to commercial magnetic tape on poly(ethylene terephthalate) support.

It is a further object of this invention to provide a magnetic recording tape having excellent radiation resistance and dimensional stability under conditions of varying temperature and humidity and having high tensile strength and high modulus in the lengthwise direction.

Another object is to provide unexpectedly improved magnetic recording tape having lower elongation at break (less than 40%), and higher widthwise modulus (greater than $6.0\times10^5$ p.s.i.).

The polyesters to be formed into film for use according to the present invention can be produced by condensing the free dibasic acid or a lower alkyl diester of 2,6-naphthalenedicarboxylic acid with ethylene glycol wherein the dibasic acid or diester thereof can be partially replaced with up to 25 mole percent of another dibasic acid such as terephthalic, isophthalic, phthalic, 2,5- or 2,7-naphthalenedicarboxylic, succinic, sebacic, adipic, azelaic, carbonic, suberic, pimelic, glutaric, etc., or a diester thereof, and up to 25 mole percent of the total molar amount of ethylene glycol can be replaced with another glycol, such as 1,3-propanediol, 1,4-butanediol, neopentyl glycol, 1,4-cyclohexanedimethanol, etc. Such polyesters are linear high melting polyesters essentially derived from equimolar proportions of a dibasic acid and a glycol.

A polyester, as just described, can be heated and the molten material extruded in a substantially amorphous condition in the form of a thin film onto the surface of a highly polished metal quenching roll or other appropriate film-forming surface. The amorphous polymer can then be stretched at 105°–150° C. (preferably 115°–140° C.) in the lengthwise direction from about 3.5 to about 6.0 (preferably 4.0 to 5.5) times its original length and can then be adjusted advantageously at 105°–150° C. (preferably 115°–140° C.) in the transverse or widthwise direction anywhere from about 0.9 to about 1.4

(preferably about 1.0 to about 1.3) times its original width, i.e., from about zero stretch (or slightly contracted by up to about 10% reduction in width) up to about a 40% widthwise stretch. The oriented film is thereafter advantageously subjected to a heat-setting or crystallizing treatment (while restraining against shrinkage) at a temperature usually above about 120° C. and up to as high as about 250° C. or more in some cases, preferably 200°–240° C. The heat set film can then be heat relaxed within the same temperature range without restraint against shrinkage. Tentering of plastic films or sheet material is illustrated in U.S. Patent 2,823,421.

The film can then be coated with a nonmagnetic binder in which are dispersed magnetizable particles of $Fe_2O_3$ or similar magnetically susceptible material.

In making a magnetic recording tape, in accordance with one embodiment of the invention, a magnetically susceptible material such as magnetic iron oxide ($Fe_2O_3$) may be prepared by grinding the oxide to a suitable degree of fineness in a ball mill or other grinding device in a manner well known in the art. The iron oxide particles are then distributed in a nonmagnetic coating medium such as a solution of poly(vinyl chloride-acetate) in methyl isobutyl ketone, and containing a small amount of oleic acid, and this composition coated on the polyester support and distributed evenly thereon as by means of a doctor blade or similar device, as is well known in the film coating art.

The final sheet may have any desired or convenient width and a thickness between about 0.5 to about 5 mils.

In the examples set forth below the following formula for a suitable coating is used:

| | Parts by weight |
|---|---|
| Poly(vinyl chloride-acetate) | 30 |
| Oleic acid | 3 |
| Methyl isobutyl ketone | 150 |
| Magnetic $Fe_2O_3$ | 100 |

The binder containing the magnetizable particles was applied by spreading the solution on the polyester sheet or support and "doctoring" with a doctor blade to produce a final coating thickness after drying of 0.3 to 0.5 mil. The dried coated film was then heated for one minute at a temperature of 115° C. to 120° C. to give an excellent sound recording tape.

Having set forth above a general description of this invention and how a magnetic tape may be made in accordance therewith, the following specific examples and description will further serve to illustrate the invention, but are not intended as a limitation thereof.

EXAMPLE 1

Amorphous poly(ethylene - 2,6-naphthalenedicarboxylate) film is drafted about 4.5 times over differently-driven pairs of S rolls in an oven at 124–126° C. The widthwise direction adjusts itself within the range of 0.92–0.98 its original width. Heat setting and heat relaxing are as described above. The resulting film is about 1 mil thick and is coated with a magnetic binder as described above, and has outstanding lengthwise physical properties, when tested in an Instron tensile tester, which are as follows: modulus $19.2 \times 10^5$ p.s.i., tensile strength at break, 56,100 p.s.i., elongation at break 20%.

EXAMPLES 2, 3, AND 4

Amorphous poly(ethylene - 2,6-naphthalenedicarboxylate) film is drafted about 4.3 times over differentially-driven pairs of S rolls under radiant heaters. Lengths of this film are given an additional widthwise stretch and heat-set, by passing them through an enclosed tenter in which widthwise stretch was imposed by divergence of the tenter clips for a run of 20 ft., followed by a non-stretching parallel run of the tenter a distance of 45 ft. during which the sheet is subjected to a heat-setting or crystalling temperature of about 219–224° C. These films are then coated as in Example 1, after which they are tested and found to have outstanding physical properties, as listed in Table 1 below.

Examples A and B are disclosed for comparative purposes and are not encompassed by the claims. Although useful balanced or unbalanced films for ordinary purposes can be prepared at more normal stretch ratios (2–5× lengthwise by 2.5× widthwise) such films do not have the outstanding attributes described and claimed for this invention.

TABLE 1

| Example | Approx. thickness, mils | Widthwise stretch ratio | Temp. of widthwise stretch, ° C. | Lengthwise modulus, $10^5$ p.s.i. | Lengthwise strength at break, p.s.i. | Lengthwise elong. at break, percent |
|---|---|---|---|---|---|---|
| 2 | 1.35 | 1.1X | 121 | 12.2 | 58,300 | 30 |
| 3 | 1.45 | 1.2X | 121 | 14.0 | 59,900 | 27 |
| 4 | 1.4 | 1.4X | 123 | 13.6 | 59,100 | 30 |
| A | 1.0 | 2.0X | 124 | 12.0 | 50,400 | 37 |
| B | 0.8 | 2.5X | 124 | 11.0 | 47,500 | 38 |

EXAMPLE 5

Poly(ethylene - 2,6 - naphthalenedicarboxylate) film is prepared under the same conditions as those used for Example 4 above. This film is then slit to ¼-inch width and tested along with two commercial magnetic tapes of the same width. Table 2 below gives tensile properties in the lengthwise direction on these films and compares these tapes with a tape as disclosed in our U.S. Patent 3,284,223, cited above.

It can be seen from the values in Table 2 that the tapes of our present invention have higher modulus and tensile strength than any of the commercial tapes, as well as a lower elongation. A low elongation at break is an advantage for magnetic tape support, as discussed previously, in order that the tape when subjected to high stresses in use shall not undergo permanent stretch which would result in deterioration of program material, but instead will break cleanly permitting ready resplicing.

TABLE 2.—PROPERTIES OF ¼-IN. WIDE POLYESTER TAPE SUPPORTS

| Tape support tested | Lengthwise tensile properties | | | Approx. support thickness, mil |
|---|---|---|---|---|
| | Modulus $10^5$ p.s.i. | Strength at break, p.s.i. | Elong. at break, percent | |
| Tape of this invention | 13.8 | 55,600 | 28 | 1.3 |
| "Scotch 150," commercial magnetic tape sold by Minnesota Mining and Manufacturing Co. | 7.6 | 33,500 | 137 | 0.9 |
| "Tensilized Mylar," sold commercially by Du Pont | 10.6 | 42,000 | 65 | 0.5 |
| Polyester of terephthalic acid and 1,4-cyclohexanedimethanol as set forth in U.S. Patent 3,284,223, Table 1 | 7.5 | 41,600 | 31 | 1.3 |

EXAMPLE 6

Lengthwise tensile specimens ½-in. wide are prepared from film of Example 3 above. By using gage lengths of 4 and 2 in. with a rate of grip separation of the Model TTB Instron tensile tester (Instron Engineering Corp., Quincy, Mass.) of 20 in. per minute, tests are run at rates of loading of 500 and 1,000% per minute, in addition to the heretofore-used rate of 50% per minute. Results on the film of our invention are compared with those of commercial Scotch 150 at two different testing rates in Table 3.

TABLE 3.—HIGH SPEED TENSILE TESTS

| Testing rate | Tensile strength, p.s.i. Film of instant invention | Commercial Scotch 150 | Film shown in table of our U.S. 3,284,223 |
|---|---|---|---|
| 50% per min | 59,900 | 33,500 | 41,600 |
| 500% per min | 62,000 | | |
| 1,000% per min | 68,100 | | |
| 1,250% per min | | 29,000 | 45,500 |

The advantages to a magnetic tape support in having high tensile strength at high loading rates are discussed above and in detail in our U.S. Patent No. 3,284,223, the disclosure of which is incorporated herein by reference so as to avoid unnecessary lengthening of the present specification. It can be seen that tensile strength on the tape of our present invention actually increases at higher loading rates, whereas that of the commercial tape on poly(ethylene terephthalate) support decreases.

It can be readily appreciated that a high lengthwise tensile strength is a desirable property of a magnetic tape support, in order for the tape not to break when subjected to various occurrences in usage. These include such accidents as dropping a reel after the tape end has been secured in the recorder; allowing the top layers of tape to slip off the reel and draw tight beneath it; allowing the take-up reel to continue winding at high speed after it is fully wound; and other occurrences which impose high stress on the tapes regardless of the mechanism by which the stress is applied. Included also would be the inertial effect brought about, for example, if fast rewinding is started with a free loop in the tape between reels in a recorder/player, thus giving the tape-up reel time to reach high speed before the tape pulls taut and jerks the supply reel into motion. As the last of the free loop in the tape pulls taut between the stationary supply reel and the accelerating take-up reel, tension begins to build up in the tape, initiating elastic elongation in the latter. During this elastic elongation, energy from the take-up reel is being suddenly but recoverably stored in the tape; simultaneously, this energy is more slowly being transferred to the supply reel. As a result, the take-up reel slows down while the supply reel speeds up. As long as there is a difference in linear speed between the reels, the tape is being stretched, but at a continually diminishing rate. If the inertia of the reels is low enough and the tape's resilience is great enough, no damage will occur to the tape while the speeds of the two reels equalize. But if the inertial conditions and the tape properties are not such as to permit the reel speeds to equalize by the time the tape has reached its maximum elastic elongation, then the tape must either break or undergo permanent elongation. It is from a consideration of the importance of the difference in which these two events takes place that one can appreciate the advantage to a tape support of a low lengthwise tensile elongation. Thus, a tape which has been recorded and then broken or cut cleanly can be spliced with no loss or deterioration of program material. On the other hand, a stretched length of tape is ruined and must be cut off; furthermore, it may lead to further deterioration along the length of the tape. Consequently, for both professional and amateur sound tape recording, the preferred behavior under any conditions of excessive stress is for the tape to break without elongating. It is a characteristic of commercial tapes on poly(ethylene terephthalate) support that they undergo considerable deformation before breaking. It is shown in the examples that the tape of our invention is superior in this respect to commercial poly(ethylene terephthalate) tapes.

The desirability of a high lengthwise tensile modulus for magnetic tape can also be readily appreciated. The higher the modulus, the greater is the resistance of the tape to elastic change of length under tension. It is obvious that any change of length in a tape is undesirable. In addition, it is well known that the stiffness of a tape is proportional to its tensile modulus and also to the cube of its thickness. Thus, with tape of a higher modulus, constant stiffness can be maintained while reducing the thickness in proportion to the cube root of the modulus. As a result, more tape can be wound on a fixed reel size, with obvious consequent benefit from longer playing time. An actual example will more clearly illustrate this advantage. From Tabe 2 in Example 5 above, the modulus of a commercial tape on poly(ethylene terephthalate) support, Scotch 150, is $7.6 \times 10^5$ p.s.i., a value only 0.55 that of the tape of our invention in the same table. Thus, since $$\sqrt[3]{0.55}=0.82$$

we need use a support thickness with our tape which is only 82% of that of Scotch 150 to obtain the same stiffness. This reduced thickness means that about 20% more of our tape can be wound on a given reel size, with corresponding increase in playing time.

The importance of a high widthwise modulus in a tape support can be appreciated from a consideration of winding behavior of tapes. In winding and rewinding of a tape, it is important that the tape follow the edge guides and avoid "riding up" against the flanges of the take-up reel, since such riding up could obviously lead to tape damage. The widthwise stiffness determines the ability of the tape to resist this riding up tendency, and the widthwise stiffness is a linear function of the widthwise modulus. Thus a high widthwise modulus confers desirable winding behavior in a tape.

We have found an additional novel and unexpected advantage of the tapes of this invention compared to commercial tapes, as follows. One of the disadvantages of poly(ethylene terephthalate), the support for the strongest and toughest existing commercial tapes, is the fact that it slowly degrades with time in the presence of moisture, especially at elevated temperatures, on account of molecular breakdown by hydrolysis. In fact, at high temperatures in the presence of moisture, films of poly (ethylene terephthalate) undergo such rapid hydrolysis that in a few days they become white and so embrittled that they simply crumble to pieces readily between the fingers. We have found unexpectedly that the tapes of our invention have greatly improved hydrolytic stability over that of commercial poly(ethylene terephthalate) tape supports. This is unexpected in view of an article by E. F. Izard in Chemical and Engineering News, vol. 32, No. 38, Sept. 20, 1954, on page 3276. Also it is noted that the polymeric material used as a film base for this invention has excellent radiation resistance as reported in Chemical and Engineering News, May 17, 1965, pages 38–39.

The linear polyester which after orienting by the means disclosed in our invention constitutes the tape support of our invention is not new. It is disclosed, for example, in British Patent 604,073, which claims various processes for its manufacture. Although British 604,073 mentions that highly polymeric linear esters may be formed from the melt into shaped articles, for example, films or mouldings, nowhere in British 604,073 is there any mention of orienting of film, so that there is no suggestion of the orienting regime of our invention or of the outstanding physical properties of the resulting tape supports for magnetic recording purposes.

There is considerable prior art on orienting poly(ethylene terephthalate) for tape support and other film uses. British 829,009 describes a recording tape on a support comprising an asymmetrically oriented polymeric linear terephthalate ester film. Amborski's U.S. Patent 2,975,-484, discloses orienting polymeric linear terephthalate ester film by stretching from 3.7 to 5.0 times lengthwise and 1.5 to 3.0 times widthwise, followed by heat setting. We believe that the physical properties achieved on the tape supports of this invention are greatly and unexpectedly superior to those of similarly-oriented poly(ethylene terephthalate) so much so that patentable novelty should reside in this fact alone. It can readily be shown that Amborski does not teach our invention since it would be impossible to use the full range of his orienting conditions on the polyester of our invention. Thus Amborski discloses longitudinal orienting temperatures between 80 and 120° C. for terephthalate polyesters. But the second-order transition temperature determined by differential thermal analysis for poly(ethylene-2,6-naphthalenedicarboxylate), the polyester of our invention, is 108° C., so that it would not be possible to orient this polyester at temperatures as low as 80° C. Stretching at temperatures in the range of 108–80° C. would result in uncontrollable "necking" and cold-drawing without proper development of orientation, and the film would break before it could be extended to the amounts required for maximum development of physical properties.

It is believed that the high modulus obtained on the tapes of our invention are quite unexpected and therefore novel from a theoretical consideration of forces of attraction in molecules. It is generally believed that attraction between molecules in a material gives rise to the resistance which that material offers to attempts to deform it. This resistance is manifested in the tensile modulus of the material. It is shown in treatises on physical chemistry, for example in "Textbook of Physical Chemistry" by Samuel Glasstone, second edition, published in 1946 by D. Van Nostrand Co., Inc., p. 300, that the attractive force between two molecules is obtained by differentiation with respect to $r$ of the expression for the energy of attraction in terms of $r$, where $r$ is the distance between molecules. There are theoretical reasons for believing that the attractive energy between molecules is inversely proportional to the 6th power of $r$, as discussed, for example, in a paper by F. London in Transactions of the Faraday Society, vol. 33, 1937, beginning on p. 8. Thus, the attractive force between molecules will be inversely proportional to the 7th power of $r$, their distance apart. For molecules such as polyesters, we can use the cube root of the density as a measure of the distance between molecules. We are thus led to the prediction that for oriented polyesters, the ratio of their modulus values should be inversely proportional to the seven-thirds power of the ratio of their densities. This prediction is satisfactorily borne out by a consideration of poly(ethylene terephthalate) film and the film of our U.S. Patent No. 3,284,223. In Table 1, p. 17 of the latter, we show a lengthwise modulus of $7.5\times10^5$ p.s.i. for film as described in our patent, the density of which was about 1.226 g./cc. The density of crystalline poly (ethylene terephthalate) is about 1.39 g./cc. The ratio $1.39/1.226=1.134$, and $(1.134)7/3=1.34$, and so one would predict a modulus of $1.34\times7.5=10.0\times10^5$ p.s.i. for poly(ethylene terephthalate) film oriented similarly to the film of our patent. Since the latter was asymmetrically oriented, we should use tensilized Mylar film as the closest commercial approach for comparison. In Table 2 in Example 5, a modulus of $10.6\times10^5$ p.s.i. is given for tensilized Mylar film in excellent agreement with the predicted value. But now consider the films of this invention, with a density of about 1.354. Making a similar calculation to that above, again using the above values for film as described in our patent, we are led to a prediction of only $9.4\times10^5$ p.s.i. for films of poly(ethylene-2,6-naphthalenedicarboxylate). We show in Table 1, however, modulus values of $12–14\times10^5$ p.s.i., and the film of Example 1 had a modulus of over $19\times10^5$ p.s.i. We hold that these extremely high modulus values are completely unexpected in view of the theoretical considerations discussed above, and confer patentable novelty, as well as an outstanding technical advance.

According to another aspect of this invention there is provided magnetic tape apparatus comprising magnetically sensitive recording and pick-up means, a magnetic tape supply reel, a magnetic tape pick-up reel, means for independently turning said reels, magnetically sensitive tape wound upon at least one of said reels and means for accelerating the rotation of one reel with respect to the other whereby tape can be wound in the lengthwise direction at a high strain rate of at least 1,000% per minute, said tape being especially characterized by having a lengthwise tensile strength of at least 60,000 lbs./sq. in. at a high strain rate of 1,000% per minute.

Although the invention has been described in considerable detail with particular reference to certain preferred embodiments thereof, variations and modifications can be effected within the spirit and scope of the invention as described hereinabove.

We claim:

1. An improved magnetic recording tape comprising a thin layer of magnetically susceptible material dispersed in a nonmagnetic binder coated on a flexible support consisting essentially of an asymmetrically oriented high-melting linear polyester of substantially equimolar proportions of a dicarboxylic acid and a glycol, said dicarboxylic acid being essentially composed of 2,6-naphthalenedicarboxylic acid and said glycol being essentially composed of ethylene glycol, which support is characterized in that it has a lengthwise tensile strength of at least 60,000 p.s.i. at a high strain rate of 1000% per minute and has a lengthwise modulus of elasticity of at least $12\times10^5$ p.s.i.

2. A tape as defined by claim 1 in which the support is oriented by longitudinal stretching in the range of from about 3.5 to about 6.0 times, and adjusting the widthwise dimension within the range of from about 0.90 and about 1.4 times the width of the longitudinally stretched support.

3. A tape as defined by claim 2 wherein the oriented support is oriented at a temperature within the range of about 105°–150° C. and the support is heat-set at a temperature within the range of from about 120° to about 250° C.

4. A tape as defined by claim 2 wherein the oriented support is oriented by stretching within the range of from about 4.0 to about 5.5 times, is adjusted widthwise within the range of from about 1.0 to about 1.3 times and is heat set within the range of from about 200° C. to about 240° C.

5. A tape as defined by claim 4 wherein the oriented heat set support is heat relaxed within the range of from about 200° C. to about 240° C.

6. A tape as defined by claim 5 wherein the widthwise modulus of elasticity is at least about $6.0\times10^5$ p.s.i.

7. A tape as defined by claim 5 wherein the lengthwise modulus is about $19\times10^5$ p.s.i.

(References on following page)

References Cited

UNITED STATES PATENTS

| | | | |
|---|---|---|---|
| 2,975,484 | 3/1961 | Amborski | 117—236 X |
| 3,161,710 | 12/1964 | Turner | 117—128.4 X |
| 3,284,223 | 11/1966 | Watson et al. | 117—236 |
| 3,397,072 | 8/1968 | Alles | 117—236 X |
| 3,423,370 | 1/1969 | Fitz et al. | 260—75 |
| 3,432,591 | 3/1969 | Heffelfinger | 117—7 |

MURRAY KATZ, Primary Examiner

B. D. PIANALTO, Assistant Examiner

U.S. Cl. X.R.

117—7, 138.8, 237